Jan. 13, 1959    H. A. TOULMIN, JR    2,868,008
BUILDING BRICK
Filed Dec. 1, 1953    2 Sheets-Sheet 2

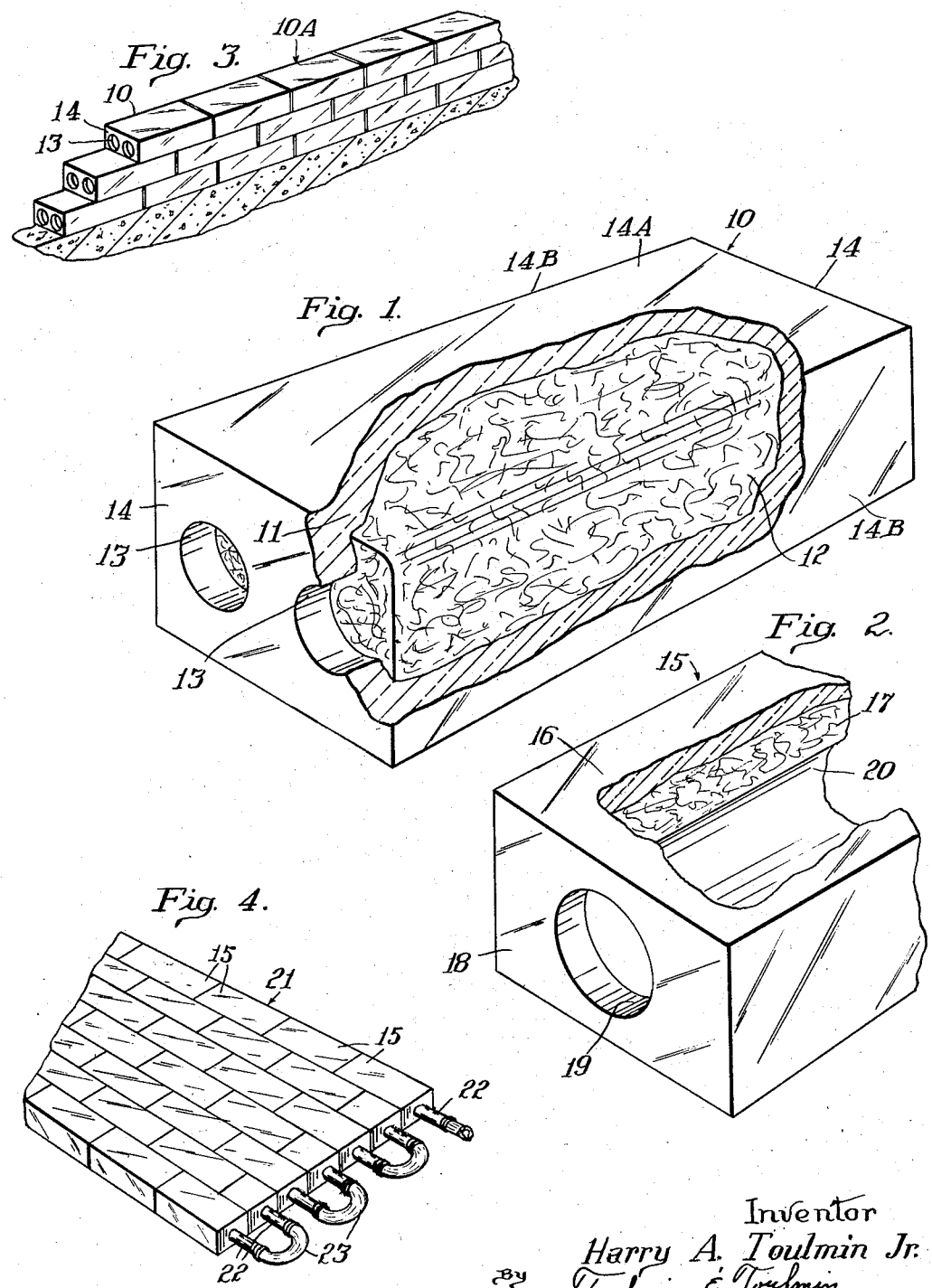

LINE MOLD HALF
WITH SOFT CERAMIC

PLACE GLASS FIBER
BLOCK IN PLACE

PLACE UPPER MOLD
HALF IN POSITION

PLACE END PLUGS
IN POSITION

FILL MOLD CAVITY
WITH SOFT CERAMIC

APPLY HEAT TO
SOLIDIFY CERAMIC

Inventor
Harry A. Toulmin Jr.
By Toulmin & Toulmin
Attorneys

United States Patent Office 2,868,008
Patented Jan. 13, 1959

2,868,008
BUILDING BRICK

Harry A. Toulmin, Jr., Dayton, Ohio, assignor to The Commonwealth Engineering Company of Ohio, Dayton, Ohio, a corporation of Ohio Application December 1, 1953, Serial No. 395,467

4 Claims. (Cl. 72—36)

This invention relates to a construction element, more particularly to a light-weight ceramic brick and the method of making same.

Heretofore the use of ceramics in construction has been rather limited for several reasons. Ceramic members are relatively expensive and consequently have been used only in special applications where their high cost is warranted. Such special applications have been hospitals, laboratories and the like. In addition, a ceramic brick is a relatively poor heat insulator, and consequently the use thereof is further limited due to this characteristic of ceramics. Furthermore ceramic bricks are comparatively fragile, and consequently they suffer a high breakage rate. When all of these factors are combined, it can be understood that a building brick made of ceramic material has not been a particularly desirable construction element.

The present invention discloses a new type of ceramic brick which eliminates all of the disadvantages enumerated above. The building brick as disclosed in this invention essentially comprises a glass fiber filler member having a ceramic casing therearound. By substituting this glass fiber filler for the ceramic material that heretofore would have been present in the center of the brick, it can be seen that a light-weight brick is obtained. Also, as glass fibers possess good insulating qualities it can be seen that this improved building brick also possesses insulating characteristics not present in ceramic bricks of the prior art. It is also pointed out that the ceramic casing is fused to the outer glass fibers of the filler member and consequently the filler member serves to reinforce the ceramic casing. The result is a ceramic brick which is somewhat less fragile than an all ceramic building element. As this improved brick is less susceptible to breakage the result is decreased cost in handling and shipping these improved bricks.

The light-weight brick disclosed in this invention has many potential uses in construction. One important use to which this product can be put is that of interior surfaces which are to have radiant heating means therein in order to heat a room. Because of their strength and insulating qualities these bricks may also be used to construct exterior walls where a different decorative effect is sought than that which could be achieved with the use of ordinary building materials.

It is an object of this invention to provide a ceramic construction element.

It is another object of this invention to provide a light-weight ceramic brick which has insulating qualities.

It is an additional object of this invention to provide a light-weight ceramic building brick which has a glass fiber filler member therein. It is a further object of this invention to provide a light-weight ceramic building brick having a glass fiber filler member therein which is impregnated with a binding agent in order to unite the fibers into a block.

It is a still further object of this invention to provide a process to produce a light-weight ceramic brick. It is another object of this invention to provide a process to produce a ceramic brick having a glass fiber filler member therein, and a ceramic casing fused to said glass fiber member.

These and other objects and advantages of the invention will be readily apparent from the following description taken in conjunction with accompanying drawings:

Figure 1 is a perspective view of the ceramic brick of this invention with a portion of the ceramic casing removed;

Figure 2 is a partial perspective view of an embodiment of this invention with a portion of the ceramic casing removed in order to illustrate the passage through the brick;

Figure 3 is a perspective view of one type of construction utilizing the invention as disclosed in Figure 1;

Figure 4 is a perspective view of a surface having radiant heating means therein wherein the surface is constructed from the embodiment of the invention as illustrated in Figure 2.

Figure 5:
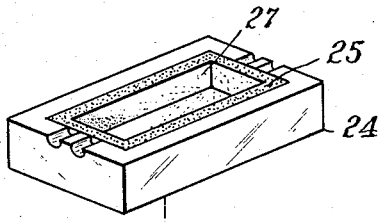
Figures 5 through 10 illustrate the steps in producing the ceramic brick disclosed in Figure 1.

Returning to the accompanying drawings, more particularly to Figure 1, wherein like reference characters indicate the same parts throughout the various views, 10 indicates generally a ceramic brick constructed in accordance with this invention. The ceramic brick 10 comprises a ceramic casing 11, which has a shape somewhat similar to the conventional building brick. This ceramic casing 11 may be made of the usual ceramic constituents used in the construction of ceramic building elements such as, for example, a mixture of shales, clays, or clay with or without coloring oxides. If it is desired to produce a ceramic brick of a particular color, the proper coloring oxide, such as an oxide of cobalt, uranium, chromium, etc., may be introduced into the ceramic mixture.

Within the ceramic casing 11 is a filler member 12. The filler member 12 is comprised of a compacted mass of glass fibers which is impregnated with a binding agent to give some body to the filler member 12. While it is particularly desirable that glass fibers be used for this filler member, in view of the characteristics of glass fibers, it is not necessary that the material from which this filler member 12 is constructed be limited to glass fibers. Any other suitable inorganic fibers may be used.

The binding agent utilized to bind the glass fibers into a filler member may be a suitable synthetic or natural resin. If it is desired to use a synthetic resin, phenol-formaldehyde by way of example, may be employed. In place of synthetic resins a natural resinous material may be employed as, by way of example, manilla gum resin or ester gum. As pointed out later, the ceramic brick is produced by molding, and consequently it is preferable that a thermosetting binder be used.

In the invention as disclosed in Figure 1, openings 13 are made in each of the end walls 14 of the ceramic brick 10. The presence of the openings 13 serves to further decrease the weight of the ceramic brick 10 without unduly detracting from the strength characteristics thereof. Furthermore, when the brick 10 is assembled as illustrated in Figure 3, the openings 13 serve as spaces wherein dead air is entrapped, and consequently further serve to insulate the structure.

The brick 10 further comprises the faces 14A and the side walls 14B. The faces and the side walls are relatively smooth and have no openings therein.

Figure 2 discloses an embodiment of the invention which is particularly suitable for use in radiant heating or cooling. Figure 2 discloses a ceramic brick indicated generally as 15 having an outer ceramic casing 16, and a glass fiber filler member 17 therein. On each end of wall 18 of the ceramic brick 15 is an opening 19. A cylindrical passageway 20 passes longitudinally through glass filler 17 and is so positioned as to co-operate with the openings 19 in each of the end walls 18.

In Figure 3 there is disclosed a wall structure 10A, which is constructed from the bricks 10 illustrated in Figure 1. The wall structure 10A is substantially of the conventional type in that the bricks 10 are laid end to end in tiers. This wall structure may be of greater width than that obtained from one tier of bricks, as shown in Figure 3. It should also be pointed out that these bricks may be easily used in tiers which are formed by arranging the bricks face to face. With this structure it would be necessary, of course, to put some sort of facing upon the ends 14 of the bricks, as these ends 14 have the apertures 13 therein, which expose the glass fiber filler to the atmosphere.

The wall structure of Figure 3 should not be construed as limited to being constructed of the bricks 10. If desired, the bricks 15, disclosed in Figure 2, may be arranged in the same manner as previously described in order to form a wall structure. When the bricks 15 of Figure 2 are laid end to end so that the cylindrical passageways of a plurality of bricks are in alignment, a retaining rod (not shown) may be inserted through the aligned passageways in order to serve as a reinforcing member. In addition, the use of a rod of considerable length will greatly facilitate the making of a wall structure when it is desired that the bricks 15 be in end-to-end relationship. By threading a plurality of bricks 15 on a rodlike member, it will be seen that it is relatively a simple matter to obtain a considerable number of bricks in exact alignment. Thus by using the brick disclosed in Figure 2, it can be seen that the effort in constructing a brick wall structure may be considerably reduced.

Figure 4 discloses a floor structure 21 constructed from the ceramic bricks 15 disclosed in Figure 2. As illustrated in Figure 4, pipes 22 through which passes low-pressure steam, are inserted through the openings 19 and passageway 20 of each of the bricks 15. These pipes are connected at the ends of the floor structure by means of the U-shaped elbow 23. By using the bricks 15 in this floor structure an even distribution of heat is obtained. As the filler members 17 have good insulating qualities, the heat is not quickly dissipated with the first entrance of the steam through the pipe 22, rather steam passes through the complete system of pipes in the floor structure 21 and causes all of the filler members 17 gradually to accumulate heat and then conduct this heat through the ceramic casings 16, and heat by radiation the room containing the floor structure.

By employing the bricks 15 disclosed in Figure 2 in a wall structure such as illustrated in Figure 3, it is possible to obtain radiant heating from a wall structure.

It should be pointed out that in respect to Figure 4 it would be possible to circulate a refrigerant through the pipes 22. In this situation, the surface 21 could be used for cooling purposes. As previously pointed out, the superior insulating qualities of the bricks disclosed in this invention make these bricks very conducive for use in cooling as well as heating purposes.

The process of producing the ceramic brick disclosed in this invention is illustrated in Figures 5 through 10. Each one of these figures illustrates one of the steps in making this ceramic brick, and each step will be discussed in detail.

The first step in producing this ceramic brick is to line bottom mold 24 with a soft ceramic material 25. This step is clearly illustrated in Figure 5.

Next a glass fiber block 26 is placed within the cavity 27 formed by lining the bottom mold half 24 with the ceramic 25.

Figure 7:
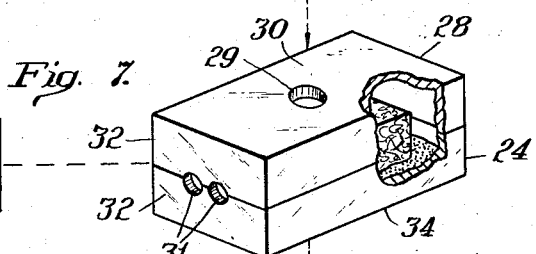

The upper mold half 28 is then placed in co-operating relationship with the lower mold half 24. It can be seen that the upper mold half 28 has an aperture 29 in the upper face 30 thereof. As illustrated in Figure 7 there are two apertures 31 in the end wall 32 of the assembled mold halves 24 and 28.

Figure 8:
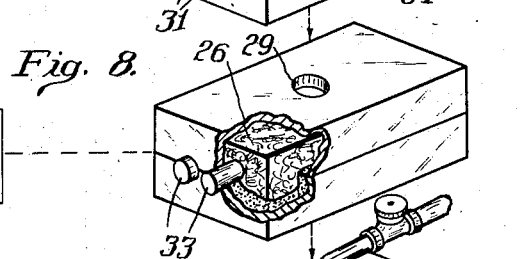

In the step illustrated in Figure 8, end plugs 33 are placed in the apertures 31 in the assembled mold 34.

Figure 9:
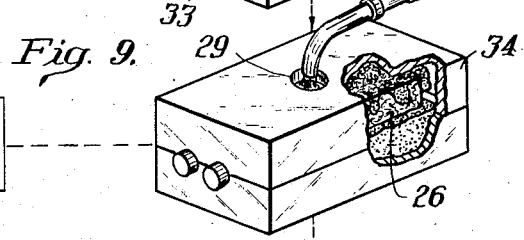

In the step illustrated in Figure 9, ceramic material is inserted through the opening 29 into mold 34. This ceramic material will fill the cavity between filler block 26 and the upper mold half 28.

When this cavity has been filled, mold 34 is then placed within an oven 35, and the entire assembly is baked until the ceramic is solidified. This step is illustrated in Figure 10.

When the ceramic has been baked a suitable length of time the mold 34 is removed from the oven 35, the end plugs 33 are removed, and the mold halves separated. The end product is a ceramic brick such as illustrated in Figure 1.

Figure 10:
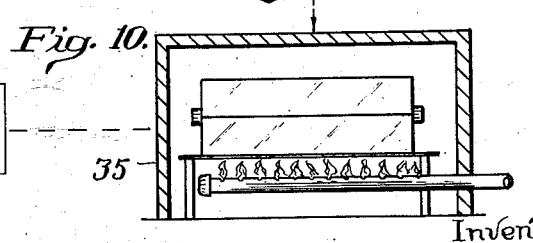

If it is desired, an additional step may be undertaken after the step illustrated in Figure 10. When the cavity in the upper mold half 28 has been filled with ceramic, one of the end plugs 33 may be removed and a vacuum line attached to the aperture 31. By applying the vacuum to the inside of the mold 34, it will be possible to cause the ceramic material to infiltrate the glass filler block 26. Consequently when the ceramic is baked the result will be a fusing of the ceramic casing with the glass fiber filler block 26. This will have a reinforcing effect on the ceramic brick and will add considerably to the strength characteristics thereof.

The glass fiber filler block 26 may be formed in any suitable manner. One method which may be used is to compact a quantity of glass fibers into substantially the shape desired of the filler block, and then impregnate this compacted mass of glass fibers with a binding agent. It is preferable that a thermosetting binding agent be employed in view of the fact that the ceramic brick is subsequently to be baked.

Figure 6:
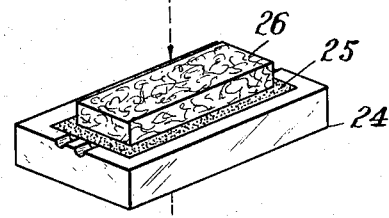

In order to produce the ceramic brick 15 illustrated in Figure 2, the same process illustrated in Figures 5 through 10 is utilized. It is necessary, however, to provide a mold 34 having an aperture (not illustrated) in the end wall 32 in order to accommodate the core member (also not illustrated) in order to obtain the openings 19 in the end walls 18 and the passage 20 through the ceramic brick 15. In this instance it would, of course, be necessary to compact the glass fibers about a cylindrical core member in order to obtain the passage 20. When a glass filler member containing this passage 20 is obtained, the filler member is placed within the bottom mold half 24 as illustrated in Figure 6, and the same process is used as indicated above, the only change being that the mold halves 24 and 28 form a single aperture in the end wall thereof.

Thus it can be seen that a ceramic brick is provided which is light in construction, has good insulating qualities, and is easy to handle. In addition this invention provides the method for producing this ceramic brick. This ceramic brick and the method of producing same should accordingly result in a more extensive use of ceramic bricks in construction.

It will be understood that this invention is susceptible to modification in order to adapt it to different usages and conditions, and accordingly it is desired to comprehend such modifications within this invention as may fall within the scope of the appended claims.

It is claimed as this invention:

1. A lightweight building brick comprising an enclosed ceramic casing substantially rectangular in shape having end walls and having a hollow interior, a glass fiber block within said hollow interior completely filling the same and comprising glass fibers compacted into a block and impregnated with a thermosetting resin binder to form an integral mass, said ceramic casing being fused to all faces of said glass fiber block, portions of the inner surface of said ceramic casing infiltrating into said glass fiber block below the outer surface thereof to form an interlocking of the ceramic casing with all surfaces of the glass fiber block.

2. A lightweight building brick comprising an enclosed ceramic casing substantially rectangular in shape having end walls and having a hollow interior, a glass fiber block within said hollow interior completely filling the same and comprising glass fibers compacted into a block and impregnated with a thermosetting resin binder to form an integral mass, said ceramic casing being fused to all faces of said glass fiber block, portions of the inner surface of said ceramic casing infiltrating into said glass fiber block below the outer surface thereof and said outer ceramic casing being baked with the glass fiber block therein so that the infiltrating portions of said casing will become interlocked with the outer surface of the glass fiber block.

3. A lightweight building brick comprising an enclosed ceramic casing substantially rectangular in shape having end walls and having a hollow interior, a glass fiber block within said hollow interior completely filling the same and comprising glass fibers compacted into a block and impregnated with a thermosetting resin binder to form an integral mass, said ceramic casing being fused to all faces of said glass fiber block, portions of the inner surface of said ceramic casing infiltrating into said glass fiber block below the outer surface thereof to form an interlocking of the ceramic casing with all surfaces of the glass fiber block, there being apertures in the closed end walls of said ceramic casing exposing said glass fiber block to the exterior.

4. A wall structure comprising a plurality of lightweight building bricks arranged to present a surface, each of said bricks comprising an enclosed ceramic casing substantially rectangular in shape having end walls and having a hollow interior, a glass fiber block within said hollow interior completely filling the same and comprising glass fibers compacted into a block and impregnated with a thermosetting resin binder to form an integral mass, said ceramic casing being fused to all faces of said glass fiber block, portions of the inner surface of said ceramic casing infiltrating into said glass fiber block below the outer surfaces thereof to form an interlocking of the ceramic casing with each of the surfaces of the glass fiber block, there being apertures in the closed end walls of said ceramic casing exposing said glass fiber block to the exterior, and mortar between cooperating faces of adjacent lightweight building bricks with the mortar between the end walls of the building bricks extending into the apertures therein to provide an interlocking between the mortar and the end walls of the bricks.

References Cited in the file of this patent

UNITED STATES PATENTS

| | | |
|---|---|---|
| 741,040 | Jones | Oct. 13, 1903 |
| 1,447,413 | Dunn | Mar. 6, 1923 |
| 1,749,159 | Respess | Mar. 4, 1930 |
| 2,075,633 | Anderegg | Mar. 30, 1937 |
| 2,152,190 | Henderson | Mar. 28, 1939 |
| 2,247,376 | Heuer | July 1, 1941 |
| 2,268,251 | Haux | Dec. 30, 1941 |
| 2,425,883 | Jackson | Aug. 19, 1947 |

FOREIGN PATENTS

| | | |
|---|---|---|
| 532,023 | France | Nov. 5, 1921 |
| 461,314 | Great Britain | Feb. 8, 1937 |